United States Patent
Barrett et al.

(10) Patent No.: US 8,015,205 B2
(45) Date of Patent: *Sep. 6, 2011

(54) METHOD AND SYSTEM FOR IMPLEMENTING AND MANAGING AN ENTERPRISE IDENTITY MANAGEMENT FOR DISTRIBUTED SECURITY

(75) Inventors: Michael Richard Barrett, Phoenix, AZ (US); David Armes, Phoenix, AZ (US); Fred Bishop, Glendale, AZ (US); James Shelby, Phoenix, AZ (US); Elliott Glazer, Chesterfield, VA (US); Phillip W. Steitz, Scottsdale, AZ (US); Stephen P. Gibbons, Glendale, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/816,296

(22) Filed: Jun. 15, 2010

(65) Prior Publication Data

US 2010/0257205 A1  Oct. 7, 2010

Related U.S. Application Data

(63) Continuation of application No. 11/457,076, filed on Jul. 12, 2006, now Pat. No. 7,765,232, which is a continuation of application No. 10/334,271, filed on Dec. 31, 2002, now Pat. No. 7,143,095.

(51) Int. Cl.
*G06F 7/00* (2006.01)
*G06F 17/30* (2006.01)

(52) U.S. Cl. ........... 707/783; 713/166; 713/169; 726/13

(58) Field of Classification Search .................. None
See application file for complete search history.

(56) References Cited

U.S. PATENT DOCUMENTS

| | | | |
|---|---|---|---|
| 5,375,244 A * | 12/1994 | McNair |
| 5,544,321 A * | 8/1996 | Theimer et al. |
| 5,555,376 A * | 9/1996 | Theimer et al. |
| 5,577,169 A * | 11/1996 | Prezioso |
| 5,940,591 A * | 8/1999 | Boyle et al. |
| 5,956,634 A * | 9/1999 | Otterson et al. |
| 6,064,972 A * | 5/2000 | Jankowitz et al. |
| 6,088,804 A * | 7/2000 | Hill et al. |
| 6,163,604 A * | 12/2000 | Baulier et al. |
| 6,279,113 B1 * | 8/2001 | Vaidya |
| 6,282,658 B2 * | 8/2001 | French et al. |
| 6,289,344 B1 * | 9/2001 | Braia et al. |
| 6,321,338 B1 * | 11/2001 | Porras et al. |
| 6,321,339 B1 * | 11/2001 | French et al. |

(Continued)

OTHER PUBLICATIONS

USPTO; Office Action dated Nov. 19, 2010 in U.S. Appl. No. 12/692,817.

(Continued)

*Primary Examiner* — Cam Y T Truong
(74) *Attorney, Agent, or Firm* — Snell & Wilmer L.L.P.

(57) ABSTRACT

An Enterprise Identity Management system includes a registration component, an ownership component, and an audit component. The registration component is configured to associate a user ID with specific accounts that are accessible via a computer system. The ownership component is configured to verify the ownership of the accounts. The audit component is configured to perform periodic checks to ensure the validity of the association between the user ID and the ownership of the accounts.

10 Claims, 2 Drawing Sheets

U.S. PATENT DOCUMENTS

| | | | |
|---|---|---|---|
| 6,442,696 | B1* | 8/2002 | Wray et al. |
| 7,376,603 | B1* | 5/2008 | Mayr et al. .................. 705/35 |
| 2002/0095482 | A1* | 7/2002 | Shuster |
| 2002/0107953 | A1* | 8/2002 | Ontiveros et al. |
| 2002/0124187 | A1* | 9/2002 | Lyle et al. |
| 2002/0133721 | A1* | 9/2002 | Adjaoute |
| 2002/0138755 | A1* | 9/2002 | Ko |
| 2002/0144149 | A1* | 10/2002 | Hanna et al. |
| 2002/0184528 | A1* | 12/2002 | Shevenell et al. |
| 2002/0184533 | A1* | 12/2002 | Fox |
| 2003/0037041 | A1* | 2/2003 | Hertz |
| 2003/0120593 | A1* | 6/2003 | Bansal et al. .................. 705/39 |
| 2003/0154406 | A1* | 8/2003 | Honarvar et al. ............ 713/201 |
| 2003/0217003 | A1* | 11/2003 | Weinflash et al. ............. 705/42 |
| 2005/0021476 | A1* | 1/2005 | Candella et al. ................ 705/64 |
| 2006/0129835 | A1* | 6/2006 | Ellmore ....................... 713/183 |

OTHER PUBLICATIONS

USPTO; Notice of Allowance dated Dec. 29, 2010 in U.S. Appl. No. 12/692,817.

PCT; International Preliminary Report on Patentability dated Nov. 19, 2004 in Application No. PCT/US2003/040093.

PCT; International Search Report dated Apr. 23, 2004 in Application No. PCT/US2003/040093.

USPTO; Office Action dated Jul. 6, 2006 in U.S. Appl. No. 10/716,251.

USPTO; Final Office Action dated Mar. 14, 2007 in U.S. Appl. No. 10/716,251.

USPTO; Office Action dated Aug. 31, 2007 in U.S. Appl. No. 10/716,251.

USPTO; Final Office Action dated Mar. 17, 2008 in U.S. Appl. No. 10/716,251.

USPTO; Advisory Action dated Jun. 26, 2008 in U.S. Appl. No. 10/716,251.

USPTO; Office Action dated Sep. 22, 2008 in U.S. Appl. No. 10/716,251.

USPTO; Office Action dated Mar. 17, 2009 in U.S. Appl. No. 10/716,251.

USPTO; Notice of Allowance dated Sep. 17, 2009 in U.S. Appl. No. 10/716,251.

USPTO; Office Action dated Sep. 10, 2004 for U.S. Appl. No. 10/334,271.

USPTO; Final Office Action dated Mar. 8, 2005 for U.S. Appl. No. 10/334,271.

USPTO; Advisory Action dated Apr. 20, 2005 for U.S. Appl. No. 10/334,271.

USPTO; Office Action dated Jun. 2, 2005 for U.S. Appl. No. 10/334,271.

USPTO; Final Office Action dated Oct. 11, 2005 for U.S. Appl. No. 10/334,271.

USPTO; Advisory Action dated Dec. 20, 2005 for U.S. Appl. No. 10/334,271.

USPTO; Office Action dated Apr. 14, 2006 for U.S. Appl. No. 10/334,271.

USPTO; Notice of Allowance dated Oct. 4, 2006 for U.S. Appl. No. 10/334,271.

USPTO; Office Action dated Sep. 22, 2009 for U.S. Appl. No. 11/457,076.

USPTO; Misc. Office Action dated Jan. 7, 2010 for U.S. Appl. No. 11/457,076.

USPTO; Notice of Allowance dated Mar. 16, 2010 for U.S. Appl. No. 11/457,076.

* cited by examiner

METHOD AND SYSTEM FOR IMPLEMENTING AND MANAGING AN ENTERPRISE IDENTITY MANAGEMENT FOR DISTRIBUTED SECURITY

CROSS-REFERENCE TO RELATED APPLICATIONS

This application is a continuation of, and claims priority to, U.S. Ser. No. 11/457,076 filed on Jul. 12, 2006 and entitled "METHOD AND SYSTEM FOR IMPLEMENTING AND MANAGING AN ENTERPRISE IDENTITY MANAGEMENT FOR DISTRIBUTED SECURITY." The '076 application is a continuation of, and claims priority to, U.S. Pat. No. 7,143,095 issued on Nov. 28, 2006 and entitled "METHOD AND SYSTEM FOR IMPLEMENTING AND MANAGING AN ENTERPRISE IDENTITY MANAGEMENT FOR DISTRIBUTED SECURITY" (aka U.S. Ser. No. 10/334,271 filed on Dec. 31, 2002). The entire contents of both are hereby incorporated by reference.

FIELD OF INVENTION

This application generally relates to computer systems and more particularly to a method and system for managing user identities in a computer system.

BACKGROUND OF THE INVENTION

Computer systems have evolved to the point where it is possible for a user to remotely access personal information via a computer. For example, one can check account balances, purchase securities, purchase goods and check the status of goods, and the like, through the use of a personal computer by using, for example, an Internet browser.

In providing services such as those listed above, it is desirable that certain types of information be accessible only by authorized users. For example, only the account holder should be able to access information regarding a bank account, be able to perform certain activities (e.g., transfers and withdrawals) on said bank account, or be able to purchase goods.

In the past, such security has typically been provided in the form of the combination of a user id and a password. For example, an account at a bank may be protected by having a user "log in" to the banking application by providing a user id and password. However, such a security system may not be as secure as desired. For example, if an unauthorized user were to become aware of the user id and password, the unauthorized user would then be able to access information and perform tasks that should be limited to a select group of people.

There are several problems with the above-described scenario. The association between a user ID and an account may become broken, resulting in a loss of on-line services. For example, a user named John Smith may select, as a user ID, JSMITH1 and an associated password for use with a bank account. His brother, Joe Smith may select, as a user ID, JSMITH2 and an associated password for use with a brokerage account. After a few months of non-use, Joe Smith attempts to log-in to his brokerage account. Not remembering his user ID, he thinks his user ID is JSMITH1. After unsuccessful log-in attempts, he contacts customer service. In the prior art, the typical method of customer service verifying the user would be to verify ownership of the account. After verifying several pieces of information with Joe Smith (e.g., social security number, mailing address, etc.), the customer service representative is convinced that Joe Smith is who he says he is and grants him access to his brokerage account using the name JSMITH1. When John Smith later tries to log-in, the same scenario may occur, as John Smith is no longer to use the JSMITH1 name that he established and contacts customer service to change the password. The result is that the JSMITH1 user ID becomes associated with both the accounts of John Smith and Joe Smith and customer service needs to intervene in order to grant the users their desired authorization level.

There is thus no system that accurately associates customer relationship and validates the ongoing integrity of the customer relationship. In particular, the prior art was solely concerned with verifying the ownership of the account, and not verifying the relationship between the user ID and the account. Such a problem may be exacerbated It is desirable to have a more robust method of managing user identities in a computerized system.

SUMMARY OF THE INVENTION

A system of the present invention for managing identities within an enterprise includes a registration component, an ownership component, and an audit component. The registration component is configured to associate a user ID with specific accounts that are accessible via a computer system. The ownership component is configured to verify the ownership of the accounts. The audit component is configured to perform periodic checks to ensure the validity of the association between the user ID and the ownership of the accounts.

A method of the present invention for issuing identities associated with accounts may first receive a request for the creation of an identity. The request is processed by a component configured to determine the existing methods used to authenticate users. Thereafter, using various algorithms, questions are generated that can be used to verify the identity of the user. Answering the questions correctly is indicative of the fact that the user is who he says he is, therefore the identity can be issued.

In addition, each transaction performed under the user identity is aggregated. Positive weighting can be assigned to successful transactions that are indicative of a ownership of the underlying account, while negative weighting can be assigned to unsuccessful transactions. Thereafter, the weightings can be analyzed to verify that the user identity is being used by the true owner of the underlying account.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

DETAILED DESCRIPTION

Figure 1:
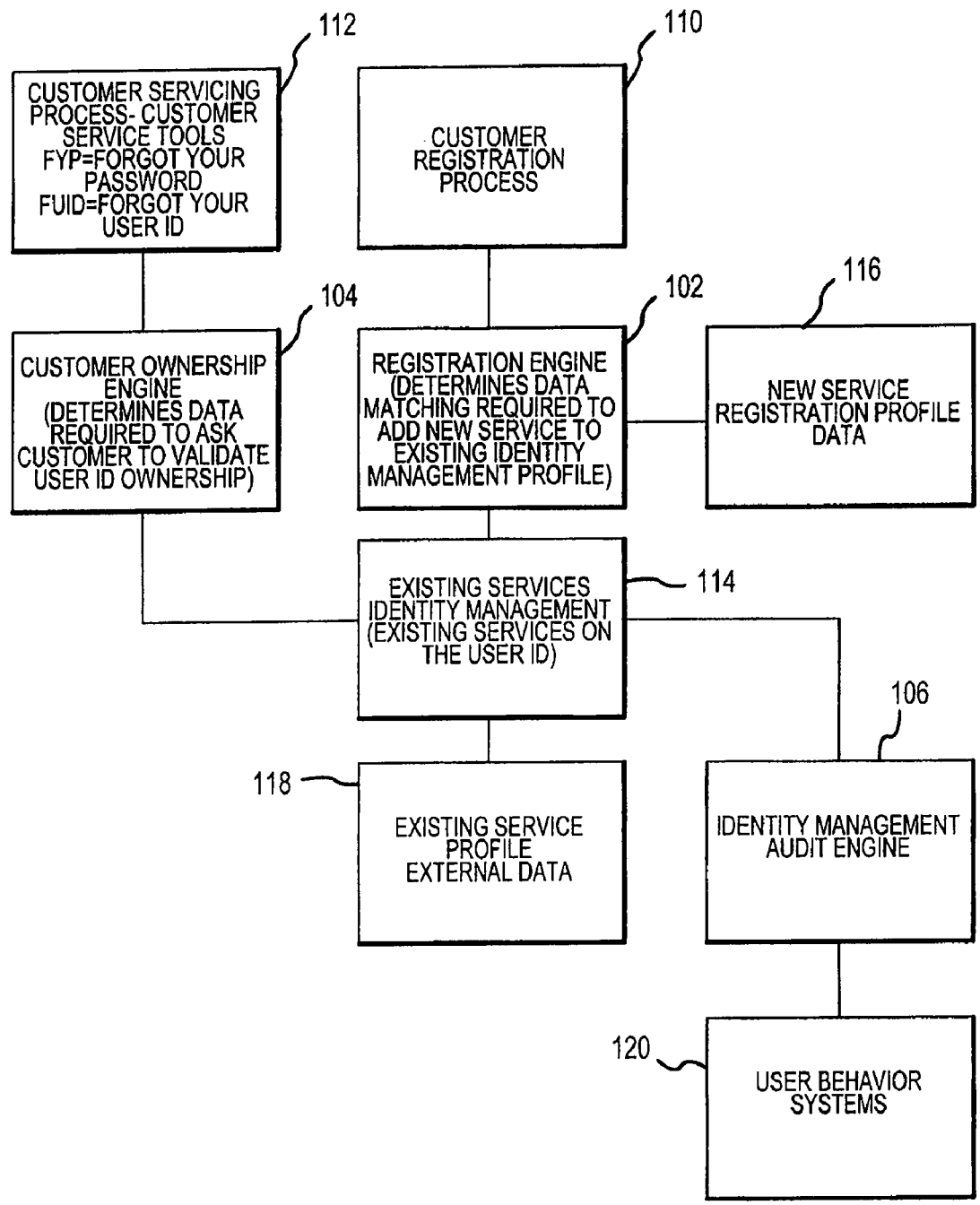
FIG. 1 presents a block diagram overview of an embodiment of the present invention.

The present invention may be described herein in terms of various functional components and various processing steps. It should be appreciated that such functional components may be realized by a variety of different hardware or structural components configured to perform the specified functions. For purposes of illustration only, exemplary embodiments of the present invention will be described herein. Further, it should be noted that, while various components may be suitably coupled or connected to other components, such connections and couplings may be realized by a direct connection between components, or by a connection through other components and devices.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction system.

The system may include a host server or other computing systems including a processor for processing digital data, a memory coupled to said processor for storing digital data, an input digitizer coupled to the processor for inputting digital data, an application program stored in said memory and accessible by said processor for directing processing of digital data by said processor, a display coupled to the processor and memory for displaying information derived from digital data processed by said processor and a plurality of databases, said databases including client data, merchant data, financial institution data and/or like data that could be used in association with the present invention. As those skilled in the art will appreciate, user computer will typically include an operating system, (e.g., Windows NT, 95/98/2000, Linux, Solaris, etc.) as well as various conventional support software and drivers typically associated with computers. User computer can be in a home or business environment with access to a network. In an exemplary embodiment, access is through the Internet through a commercially-available web-browser software package.

Database may be any type of database, such as relational, hierarchical, object-oriented, and/or the like. Common database products that may be used to implement the databases include DB2 by IBM (White Plains, N.Y.), any of the database products available from Oracle Corporation (Redwood Shores, Calif.), Microsoft Access or MS SQL by Microsoft Corporation (Redmond, Wash.), or any other database product. Database may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

An embodiment of the present invention, with respect to FIG. 1, contains a registration component (102), an ownership component (104), and an audit component (106). Registration component 102 is configured to register new users and establish a relationship between the user ID and the account or accounts related to the user ID. Ownership component 104 is configured to define the criteria used to verify the ownership of the account. Audit component 106 is configured to validate the relationships between an account and a user ID on a regular basis. A user initiates a registration process using component 110. If a customer needs help from customer service (for example, the user lost his password), such a process can be initiated via component 112. An embodiment of the present invention may also be used in conjunction with pre-existing identity management services (114), which has access to pre-existing service profile data (118).

Communication between the parties to the transaction and the system of the present invention is accomplished through any suitable communication means, such as, for example, a telephone network, Intranet, Internet, point of interaction device (point of sale device, personal digital assistant, cellular phone, kiosk, etc.), online communications, off-line communications, wireless communications, transponder communications and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

The computer may provide a suitable website or other Internet-based graphical user interface which is accessible by users. In one embodiment, the Internet Information Server, Microsoft Transaction Server, and Microsoft SQL Server, are used in conjunction with the Microsoft operating system, Microsoft NT web server software, a Microsoft SQL database system, and a Microsoft Commerce Server. Additionally, components such as Access or SQL Server, Oracle, Sybase, Informix MySQL, Intervase, etc., may be used to provide an ADO-compliant database management system. The term "webpage" as it is used herein is not meant to limit the type of documents and applications that might be used to interact with the user. For example, a typical website might include, in addition to standard HTML documents, various forms, Java applets, Javascript, active server pages (ASP), common gateway interface scripts (CGI), extensible markup language (XML), dynamic HTML, cascading style sheets (CSS), helper applications, plug-ins, and the like.

In establishing a user ID, it is preferable that a set of criteria be pre-established to facilitate relating a user ID to an account. In the context of financial services, for example, a financial service provider has a large set of data related to each account. In the instance where a user wishes to establish a user ID, registration component 102 has access to subsets of that data, allowing an establishment of a relationship between a user ID and all accounts owned by the user. For example, a user wishes to access his bank account on-line. During the registration process, registration component 102 can determine that, for example, the user also owns a brokerage account and a credit account from the same provider of the bank account. Thus, the user ID established by registration component 102 is associated with the bank account, the brokerage account, and the credit account.

Ownership component 104 is configured to establish rules to help ensure that adequate ownership information is obtained from the user during authentication. For example, if a user wishes to associate a user ID to a brokerage account, ownership component 104 is configured to determine the criteria needed to verify that the identity of the person requesting the ID is the owner of the brokerage account. A user wishing to associate a user ID to another type of account with less need for security (e.g., the ability to check the balance of a credit account) may not utilize the same criteria. For example, access to a brokerage account may require that the user input a name, social security number, date of birth, and verify various bits of information. But access to a balance checking feature may only require the user to know the name and account number.

For a business organization with multiple business lines, ownership component 104 may be configured to evaluate each business line to determine the authentication process each business line uses. Thereafter, ownership component 104 uses an algorithm to generate a set of questions or criteria that can be used by registration component 102 to verify that the requesting user is the owner of the account.

Figure 2:
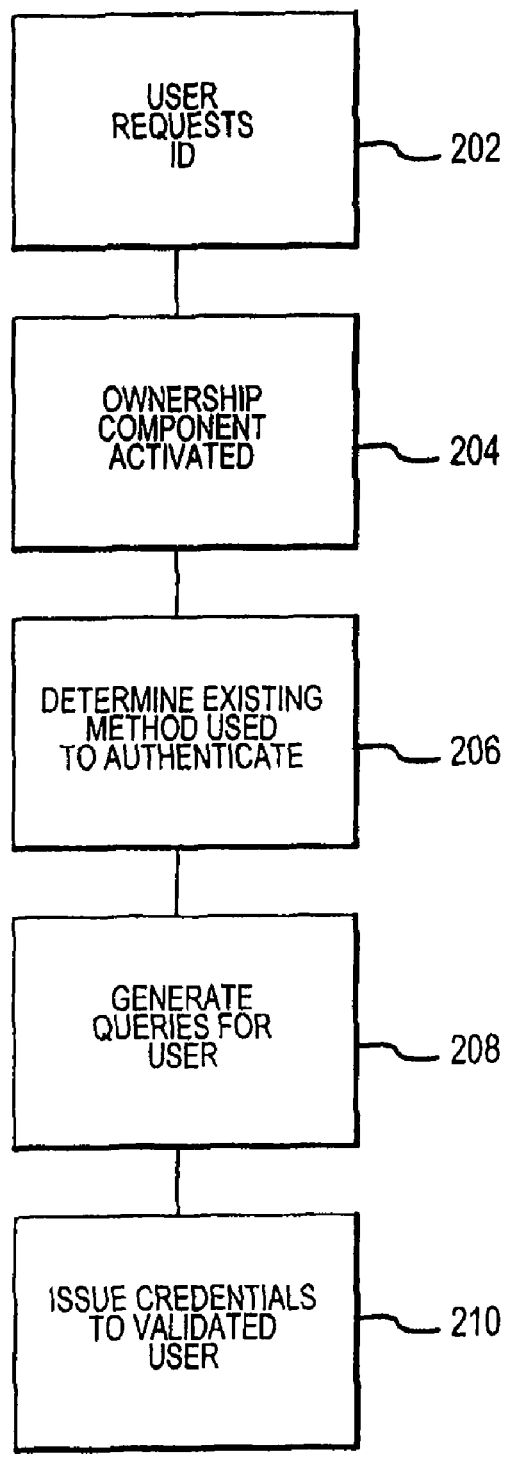
FIG. 2 is a flow chart illustrating the process by which a user creates a user ID.

With respect to FIG. 2, the process by which a user establishes a user ID with a business comprising multiple business lines is illustrated. A user accesses a business system and requests a user ID (step 202). Registration component 102 is activated and determines which accounts from the various businesses are to be associated with the user ID. In a typical usage, the user selects the various business lines he wishes to be associated with the user ID. Thereafter, ownership component 104 is activated (step 204). Ownership component 104 is configured to determine the various schemes used by the selected business lines to authenticate users (step 206). Then the various authentication processes are joined in a rules-based algorithm to generate specific questions to be asked of the user attempting to obtain a user ID (step 208). After the user correctly answers the generated questions, registration component 102 supplies the requested credentials to the user, indicating that the user was validated. (Step 210). The credentials may be in the form of a user ID/password combination, or other such access control means now known or developed in the future.

Even though a set of relationships is robustly validated at the time of the creation of the relationships, the relationships can deteriorate over time, for a number of reasons. For example, account expiration, account re-issuance (e.g., due to a stolen credit card), change in marital status (resulting in a no longer valid card that was issued to a spouse), change in address, and the like. In order to maintain an accurate management of identities, it is preferable to periodically monitor the relationships.

An embodiment of audit component 106 of the present invention utilizes a mathematical weighting function that assigns values to specific interactions captured by the system. Interactions that serve to confirm the identity of the user are assigned positive values. Examples of these types of interaction include the payment of balances, the receipt of merchandise, and similar transactions where it is unlikely that an unauthorized user performed the transaction. Interactions that serve to undermine the identity of the user are assigned negative values. Examples of such interactions include non-payment of bills, requests to receive merchandise at alternate locations.

Additionally, certain interactions may be weighted in aggregate form. In other words, some combinations of events may have relationships with each other. For example, a series of identity-undermining events may have an aggregate negative weighting that exceeds the individual negative weightings described above.

Aggregated behaviors may also include usage behaviors that can be captured as patterns using, for example, conventional pattern matching algorithms. Each usage can be compared to a typical usage pattern. Typical usage may include the typical tasks performed by the user, the location of the user (which can be determined, for example, via the IP address or addresses from which they typically connect). This pattern data may be updated at regular intervals. For example, each time the user accesses the system, a similarity score can be computed that indicates the similarity of the transaction to previous transactions. Therefore, each usage of the system establishes a usage history for the user. Thus, previous usage can be logged and compared to each subsequent usage.

Other information that can be stored includes more detailed information regarding the console the user is using. For example, the type of browser, the type of computer, the operating system, and the like, may be accessible when a user accesses the computer system.

Another embodiment of the present invention records various information about a user each time the user accesses the computer system. Examples of the information collected include the IP address from which the user accesses the computer system; the browser being used; the transactions performed on the computer system; the time of the access; and the like. This information may be collected each time the user accesses the computer system. At each subsequent access to the computer system, such information can be compared to connection information previously collected. If the information is very similar, the user can continue to perform transactions. However, if the information is different, more information may be requested from the user to confirm the user's identity.

The certainty measure may also be increased through the usage of specific questions that only a particular person would know the answer to, prior to allowing the user to perform certain transactions. For example, additional questions may be asked when a user attempts to transfer funds, obtain a cash advance, or other such transactions that have been determined to require more security to perform. Such questions are more specific and would only be known to the card holder, and not to those who, for example, steal a credit card. Such a question may include queries regarding previous purchases, questions regarding associated accounts, and the like, in addition to questions regarding the account holder, such as address, social security number, date of birth, and the like. The questions asked can be determined algorithmically using various methods. Correct answers to such questions not only allow the user to perform the requested tasks, but also increase the above-described certainty measure of the user.

It can thus be seen that the above-described problems can be eliminated by an embodiment of the present invention. For example, it would not be possible for the owner of user ID JSMITH2 to obtain access to the user ID JSMITH1, as the ownership component would determine that, although he is the owner of an account, he is not the owner of the account associated with the JSMITH1 user ID.

The present invention is described herein with reference to block diagrams, flowchart illustrations of methods, systems, and computer program products according to various aspects of the invention. It will be understood that each functional block of the block diagrams and the flowchart illustrations, and combinations of functional blocks in block diagrams and flowchart illustrations, respectively, may be implemented by computer program instructions. These computer program instructions may be loaded on a general purpose computer, special purpose computer, or other programmable data processing apparatus to produce a machine, such that the instructions which execute on the computer or other programmable data processing apparatus create means for implementing the functions specified in the flowchart block or blocks.

It will be appreciated, that many applications of the present invention could be formulated. One skilled in the art will appreciate that the network may include any system for exchanging data or transacting business, such as the Internet, an intranet, an extranet, WAN, LAN, satellite communications, and/or the like. It is noted that the network may be implemented as other types of networks, such as an interactive television (ITV) network. The users may interact with the system via any input device such as a keyboard, mouse, kiosk, personal digital assistant, handheld computer (e.g., Palm Pilot®), cellular phone and/or the like. Similarly, the invention could be used in conjunction with any type of personal computer, network computer, workstation, minicomputer, mainframe, or the like running any operating system such as any version of Windows, Windows NT, Windows2000, Windows 98, Windows 95, MacOS, OS/2, BeOS, Linux, UNIX, Solaris or the like. Moreover, although the invention is frequently described herein as being implemented with TCP/IP communications protocols, it will be readily understood that the invention could also be implemented using IPX, Appletalk, IP-6, NetBIOS, OSI or any number of existing or future protocols. Moreover, the system contemplates the use, sale or distribution of any goods, services or information over any network having similar functionality described herein.

The computing units may be connected with each other via a data communication network. The network may be a public network and assumed to be insecure and open to eavesdroppers. In the illustrated implementation, the network may be embodied as the internet. In this context, the computers may or may not be connected to the internet at all times. For instance, the customer computer may employ a modem to occasionally connect to the internet, whereas the bank computing center might maintain a permanent connection to the internet. Specific information related to the protocols, standards, and application software utilized in connection with the Internet may not be discussed herein. For further information regarding such details, see, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997). LOSHIN, TCP/IP CLEARLY EXPLAINED (1997). All of these texts are hereby incorporated by reference.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded on a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

In the foregoing specification, the invention has been described with reference to specific embodiments. However, it will be appreciated that various modifications and changes can be made without departing from the scope of the present invention. The specification and figures are to be regarded in an illustrative manner, rather than a restrictive one, and all such modifications are intended to be included within the scope of present invention.

Benefits, other advantages, and solutions to problems have been described above with regard to specific embodiments. No element described herein is required for the practice of the invention unless expressly described as "essential" or "critical".

We claim:

1. An audit system comprising:
a processor;
a memory;
a network interface communicating with the memory; said memory communicating with the processor for auditing; and said processor, when executing a computer program, performs operations comprising:
monitoring, by said processor, changes in a relationship between a user and an identity of an account over a period of time to periodically perform an automatic adjustment of authentication questions in response to a deterioration of said relationship, wherein said deterioration of said relationship is based upon activity of said user;
assigning, by said processor, a positive weight for a successful transaction by said user on said account, wherein said successful transaction is based on security requirements of said account and risk factors relating to various transaction types associated with said account;
evaluating, by said processor, a current transaction of said user by comparing said current transaction to previous transactions performed by said user;
assigning, by said processor, a positive weight for a similar transaction by said user;
assigning, by said processor, a negative weight for an unsuccessful transaction by said user on said account, wherein the assigning the positive weight for the similar transaction and the assigning the negative weight are based on the comparing;
aggregating, by said processor, said positive and negative weights to determine a usage history of said user;
removing, by said processor, a relationship between said identity and said account in response to said aggregation failing to meet a predetermined criteria; and monitoring, by said processor, aggregated behaviors, wherein said aggregated behaviors are used to weight transactions to further verify ownership of said account, said operations further comprising receiving a request for the identity, said operations further comprising issuing said identity to said user in response to at least a portion of said authentication questions being correctly answered, wherein said authentication questions to be asked are based upon authentication rules associated with said account.

2. The audit system of claim 1, said operations further comprising confirming ownership of said account.

3. The audit system of claim 1, said operations further comprising confirming ownership of said account by analyzing ownership data and generating said authentication questions to be asked of said user to verify said identity actually belongs to said user.

4. The audit system of claim 1, said operations further comprising determining said authentication rules associated with said account.

5. The audit system of claim 1, said operations further comprising determining authentication rules associated with said account, wherein authentication questions to be asked of a user are based upon said authentication rules.

6. The audit system of claim 1, said operations further comprising receiving a request for an identity associated with said account.

7. A method comprising:
  assigning, by a computer for facilitating issuance of an identity associated with an account, a positive weight for a successful transaction by a user on said account, wherein said successful transaction is based on security requirements of said account and risk factors relating to various transaction types associated with said account;
  evaluating, by said computer, a current transaction of said user by comparing said current transaction to previous transactions performed by said user;
  assigning, by said computer, a positive weight for a similar transaction by said user;
  assigning, by said computer, a negative weight for an unsuccessful transaction by said user on said account, wherein the assigning the positive weight for the similar transaction and the assigning the negative weight are based on the comparing;
  aggregating, by said computer, said positive and negative weights to determine a usage history of said user;
  removing, by said computer, a relationship between said identity and said account when said aggregating step fails to meet a predetermined criteria;
  monitoring, by said computer, aggregated behaviors, wherein said aggregated behaviors are used to weight transactions to further verify ownership of said account;
  issuing, by said computer, said identity to a user associated with said account, in response to at least a portion of authentication questions being correctly answered, wherein said authentication questions to be asked are based upon authentication rules associated with said account; and
  monitoring, by said computer, changes in a relationship between said user and said identity over a period of time to periodically perform an automatic adjustment of said authentication questions in response to a deterioration.

8. The method of claim 7, further comprising analyzing said aggregation of said positive weights and said negative weights to determine a validity of said identity.

9. The method of claim 7, further comprising:
  evaluating a current transaction of said user;
  comparing said current transaction to previous transactions performed by said user; and,
  assigning a positive weight for a similar transaction by said user.

10. The method of claim 7, further comprising assigning a negative weight for a non-similar transaction by said user.

* * * * *

UNITED STATES PATENT AND TRADEMARK OFFICE
CERTIFICATE OF CORRECTION

PATENT NO. : 8,015,205 B2
APPLICATION NO. : 12/816296
DATED : September 6, 2011
INVENTOR(S) : Michael Richard Barrett et al.

Page 1 of 1

It is certified that error appears in the above-identified patent and that said Letters Patent is hereby corrected as shown below:

On the Title page, section (75) Inventors, please delete "Phillip" and insert therefor --Philip--.

Signed and Sealed this
Fifteenth Day of January, 2013

David J. Kappos
*Director of the United States Patent and Trademark Office*